June 7, 1949.  C. R. COOK  2,472,194
FARM IMPLEMENT OR LOADER
Filed June 15, 1946   2 Sheets-Sheet 1
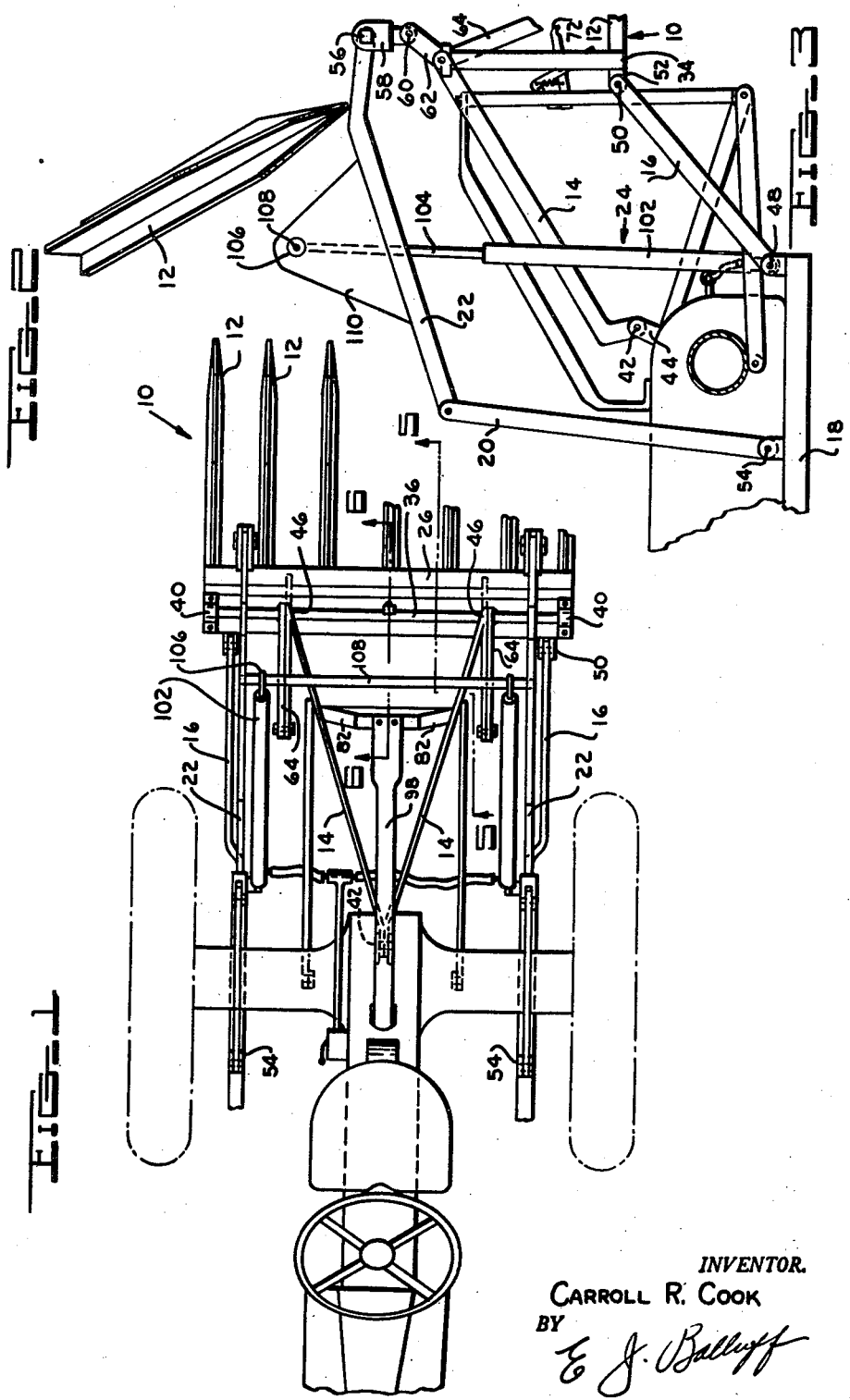
INVENTOR.
CARROLL R. COOK
BY
ATTORNEY

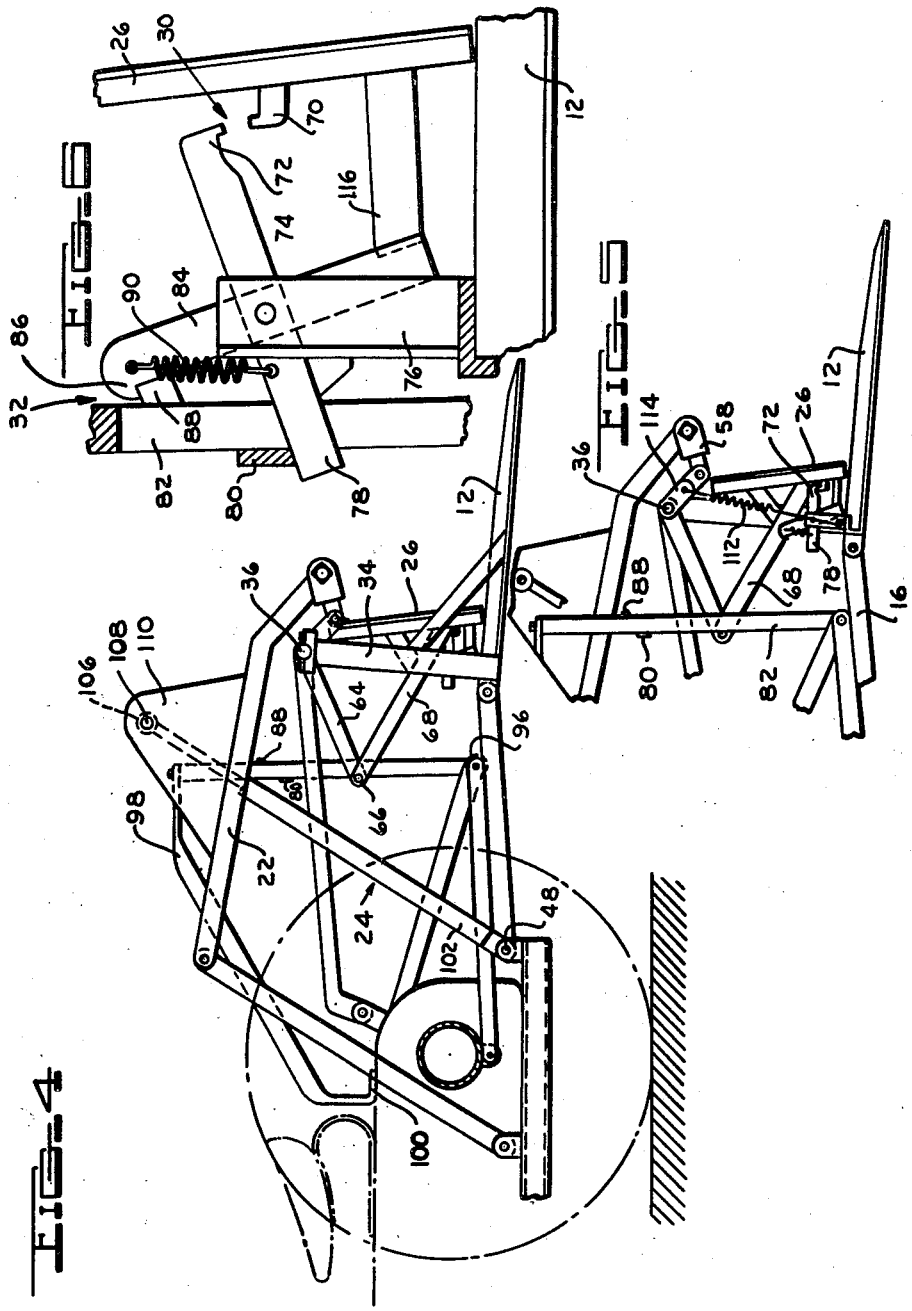

Patented June 7, 1949

2,472,194

UNITED STATES PATENT OFFICE 2,472,194

FARM IMPLEMENT OR LOADER

Carroll R. Cook, Lenawee County, Mich.

Application June 15, 1946, Serial No. 676,953

5 Claims. (Cl. 214—131)

This invention relates to farm implements and has particular reference to certain new and useful improvements in power operated loading devices. More particularly the invention contemplates a device attached to a tractor and constructed and arranged for loading material, such as manure.

Loading materials of this type comprises an important problem on the farm due to the amount of this type of work that has to be done, the work involved in doing it, and the relative inaccessibility of the particular places in which this work must be done in barns or other farm buildings.

While tractor operated devices have heretofore been suggested for this purpose, such devices have not been satisfactory because they have been slow and inefficient in operation and have been of such a nature that it was impossible to maneuver them in many of the places where work of this type needs to be done.

The present invention contemplates an attachment built onto a tractor which is constructed and arranged so as to be operated by the motive power for the tractor. The device is simple in construction, efficient in operation, and of such size that it may be maneuvered into any place where the tractor itself might be maneuvered.

Principal objects of the invention, therefore, are to provide:

A new and improved material loading device;

A mobile material loading device which is constructed and arranged to pick up a load of material, elevate such load, and discharge such load into a wagon or other suitable vehicle.

Other and further objects of the invention will be apparent from the following description and claims and will be understood by reference to the accompanying drawings, of which there are two sheets, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a fragmentary plan view of a device embodying the invention attached to a tractor;

Fig. 2 is a perspective view of the end of one of the tines of the fork;

Fig. 3 is a fragmentary side elevational view of the loading device with the fork thereof in its elevated position;

Fig. 4 is a view similar to Fig. 3 but showing the loading device with the fork in a partially lifted position;

Fig. 5 is a fragmentary sectional view taken along the line 5—5 of Fig. 1, showing the lifting fork in a partially elevated position; and Fig. 6 is an enlarged fragmentary sectional view taken generally along the line 6—6 of Fig. 1, showing the lifting fork locked in its elevated position.

As illustrated in the embodiment of the invention selected for purposes of illustration, the power operated loading device comprises in general a fork 10 having horizontally extending tines 12, means comprising links 14 and 16 pivoted to the frame 18 of the chassis of the tractor and to the fork 10 for supporting the fork for vertical bodily movement with the tines 12 thereof arranged horizontally so that the fork 10 may be inserted into a load of material which is to be loaded.

Power operated means including links 20, 22, and extensible hydraulic links 24 are mounted on the frame of the tractor chassis and connected to the fork supporting means for elevating the fork 10 with the load thereon, such power operated means being actuated from the engine of the tractor.

A push-off device or pusher 26 is mounted for movement relative to the tines 12 for pushing the load off the end thereof, such pusher 26 normally being positioned relative to the tines of the fork 10 as shown in Fig 1. The pusher is connected to the power operated means whereby the pusher may be actuated for pushing the load off the end of the tines while the tines 12 are maintained in a horizontal position.

Locking means indicated generally at 30 (Fig. 6) are provided for locking the pusher 26 relative to the fork during lifting movement of the latter, and other locking means indicated generally at 32 are provided for locking the fork in its elevated position when the pusher locking mechanism is released, said locking means being constructed and arranged so that the fork locking means 32 is released and the pusher locking means 30 reengaged upon movement of the pusher to its retracted position.

The tines 12 form a part of the fork 10, which further includes a frame having a vertical frame member 34 at each side thereof. A cross shaft 36 is journaled in bearings 40 provided at the upper end of the side frame members 34. Two links 14 are provided, one end of each of said links being pivoted at 42 to a stationary arm 44 of the tractor. The other ends of the links 14 are provided with collars 46 through which the shaft 36 extends, the shaft 36 being free to turn in the collars 46.

The links 16, of which there are two, each have one end pivotally connected at 48 to the frame of the tractor while the other end is pivotally connected at 50 to a bracket 52 carried by the frame of the fork 10. It will thus be noted that the fork 10 is supported for vertical movement between its upper and lower positions with the tines 12 of the fork projecting horizontally.

The supporting mechanism, including the links 14 and 16 and the associated parts, permits the fork 10 to be dropped to the ground or to any position above the ground so that when the tractor is backed up, the fork may be inserted into a load of material.

The elevating or lifting mechanism includes the links 20 and 22 and the extensible hydraulic links 24. The links 20, of which there are two, are pivoted at 54 to the frame of the tractor, while the links 22, of which there are two, each are pivoted at one end thereof to the upper end of the link 20. The other end of each of the links 22 is pivotally connected at 56 to one end of a link 58, the other end of which is pivotally connected at 60 to one arm 62 of a lever, the other end of such lever being fixed to the shaft 36 so as to turn with the rotation of the shaft.

A pair of pusher arms 64 is fastened to the shaft 36 to rotate therewith, the arms and levers 64 and 62 forming in effect a bell crank. The swinging ends of the arms 64 are connected at 66 to the ends of arms 68 which are fastened to the rear face of the pusher 26. The lower edge of the pusher 26 is slidable on the tines 12 and upon rotation of the shaft 36 in a counterclockwise direction (Fig. 4) the arms 64 and 68 will move the pusher 26 to the right for the purpose of pushing the material on the fork off of the ends thereof in order to unload the fork.

During the lifting operation the pusher 26 is locked against movement by means of the pusher lock 30. Such lock, as illustrated in Fig. 6, includes a locking element 70 secured to the rear face of the pusher plate 26, and a latch or locking element 72 which is engageable with the locking element 70 as shown in Fig. 5 to lock the pusher 26 against forward movement relative to the tines 12. The locking element 72 is rockably mounted on a shaft 74 which is carried by a pair of spaced upright posts 76 provided on the frame of the fork 10.

As the fork 10 moves upwardly and reaches the upper limit of its vertical movement, the other end 78 of the lever engages a stop 80 provided on a vertical frame member 82, the stop 80 lying in the path of movement of the end 78 of the lever so that the upward movement of the fork after the end 78 of the lever engages the stop 80 will separate the locking elements 70 and 72, thereby freeing the pusher plate 26 for forward or outward movement relative to the tines 12.

Another lever 84 has a latch or locking element 86 formed on one end thereof, such locking element 86 forming a part of the fork locking means 32, the other element of which comprises a stationary latch 88 mounted on the upright 82. The lever 84 is also rockably mounted on shaft 74 and a spring 90 interconnects the latch end of the lever 84 and the end 78 of the lever carrying the pusher locking element 72 so that as the pusher locking means is released, the spring 90 will function to pull the locking element 86 into engagement with the locking element 88 for locking the fork in its elevated position.

The upright 82 includes two spaced, vertically extending members which at their lower end are mounted on the stationary drawbar 96, and at their upper end are connected to the forward end of an arm 98 which is secured at 100 to the frame of the tractor.

The extensible hydraulic links 24, of which there are two, each includes a hydraulic cylinder 102, one end of which is pivotally connected at 48 to the frame of the tractor, while a rod 104 of a piston which works in the cylinder 102 projects from the other end of the cylinder 102 and is provided with a collar 106 through which a cross shaft 108 extends. The cross shaft 108 at its ends is fixed to projections 110, each of which projections is secured to an arm 22. The collars 106 are free to turn relative to the shaft 108.

With the parts arranged as illustrated in Fig. 4, the loading device is in a position where the fork 10 may be inserted into a load of material. After this has been done the device may be controlled so as to extend the hydraulic links 24. This will shift the parts from the position illustrated in Fig. 4 to that illustrated in Fig. 3, except that the lock 30 will prevent movement of the pusher plate outwardly on the tines until the fork has been lifted to a point where the end 78 of the locking lever engages the stop 80, whereupon the pusher locking means 30 will be released.

As the links 22 and 58 are tending to rotate the bell crank in a counterclockwise direction, the release of the pusher locking means 30 will permit counterclockwise movement of the bell crank 62, 64 so as to advance the plate 26 for discharging the load from the tines of the fork. At the same time the spring 90 will function to engage the fork locking means 32 so as to hold the fork in its elevated position. Thereafter, as the hydraulic links 24 are retracted, the spring 112 connected at one end to an arm 114 fixed to the cross shaft 36 and at its other end to the frame of the fork 10 functions to retract the pusher plate to its retracted position in which it is shown in Fig. 5.

An arm 116 projecting rearwardly from the back of the pusher plate 26 forms a stop for engaging the other end of the lever 84 in order to release the fork locking mechanism 32 by disengaging the locking element 86 thereof from the locking element 88 thereof. When this happens the spring 90, acting on the end 78 of the locking lever on which the locking element 72 is formed, will cause the same to engage with the locking element 70 so as to reengage the pusher locking means 30. As soon as the fork locking means 32 is disengaged, the fork will be lowered as the hydraulic links 24 are retracted.

The hydraulic cylinders 102 are adapted to be supplied with fluid under pressure from a pump driven by the motor of the tractor and under the control of a suitable manually operated valve (not shown). The valve may be of the conventional type and set so as to supply fluid under pressure to the cylinders 102 so as to extend the links 24. The valve also should be constructed so that it may be set to hold the fluid under pressure in the cylinders 102 so as to hold the links 24 at any extended position, and include means whereby the fluid under pressure may be withdrawn from the links 24 in order to permit the links 24 to be retracted. As conventional tractors are now provided with hydraulic systems including a hydraulic pressure pump and a control therefor, it is believed to be unnecessary to illustrate such conventional items here. In lieu of the hydraulic links 24, any other suitable means may be employed for operating the loading device.

From the foregoing it will be evident that the fork may be manipulated to pick up a load of material and elevate it, and that at the upper limit of elevation the pusher will automatically operate to discharge the load from the fork. In all of its movement the fork 10 is maintained so that the tines 12 are in a substantially horizontal position.

While I have illustrated and described a preferred embodiment of my invention, it is understood that this is capable of modification, and I therefore do not wish to be limited to the precise details set forth, but desire to avail myself of such changes and alterations as fall within the purview of the following claims.

I claim:
1. In a motor vehicle, a power operated loading device comprising a fork having horizontally extending tines, means for supporting said fork for vertical bodily movement with the tines thereof arranged horizontally so that the fork may be inserted into a load of material, power operated means operable for elevating said fork with the load thereon, a pusher mounted for movement relative to said tines for pushing the load off the end thereof and for movement to a retracted position, means operable for actuating said pusher by said power operated means when said fork is in an elevated position, means for locking said pusher to said fork during lifting movement thereof and arranged to be released when said fork reaches the upper limit of its vertical movement, means for locking said fork against downward vertical movement when said pusher locking means is released, said locking means being constructed and arranged so that said fork locking means is released and said pusher locking means reengaged upon movement of said pusher to its retracted position, said pusher and said fork being directly connected to said power operated means by rigid actuating members whereby said pusher, said fork, and said power operated means are operable as a unit during said movement of said fork and the movement of said pusher relative to said tines.

2. A power operated loading device comprising a fork having horizontally extending tines, mobile means for supporting said fork for horizontal movement of said tines beneath a load of material to be handled, a pusher for said fork, said pusher being mounted on said fork for advancing and retracting movement along said tines for discharging said load and for reconditioning said fork for loading, expansible and contractible power operated means mounted on said mobile means for elevating said fork into load discharging position, for lowering said fork into reloading position, and for advancing and retracting said pusher, and a latching mechanism associated with a frame connected to said mobile means and with said pusher and operable at said load discharging position, said frame and pusher being provided with stops operable at said load discharging position for actuating said latching mechanism, said latching mechanism being operable at said load discharging position by one of said stops for connecting said power operating means first to said fork and then to said pusher for elevating said fork and then advancing said pusher during one continuous expansible movement of said power operated means, and by the other of said stops first to said pusher and then to said fork for retracting said pusher and then lowering said fork during a continuous contractible movement of said power operated means, said power operated means being connected to said fork and to said pusher by rigid actuating members whereby each is directly responsive to and operable by the other.

3. A power operated loading device comprising a fork having horizontally extending tines, mobile means for supporting said fork for horizontal movement of said tines beneath a load of material to be handled, a pusher for said fork, said pusher being mounted on said fork for advancing and retracting movement along said tines for discharging said load and for reconditioning said fork for loading, expansible and contractible power operated means mounted on said mobile means for elevating said fork into load discharging position, for lowering said fork into reloading position, and for advancing and retracting said pusher, and a latching mechanism associated with a frame connected to said mobile means and with said pusher and operable at said load discharging position, said frame and pusher being provided with stops operable at said load discharging position for actuating said latching mechanism, said latching mechanism being operable at said load discharging position by one of said tops for connecting said power operating means first to said fork and then to said pusher for elevating said fork and then advancing said pusher during one continuous expansible movement of said power operated means, and by the other of said stops first to said pusher and then to said fork for retracting said pusher and then lowering said fork during a continuous contractible movement of said power operated means, said power operated means being connected to said fork and to said pusher by rigid actuating members whereby each is directly responsive to and operable by the other, said fork being mounted on parallel links attachable to said mobile means for elevating and lowering said fork with the tines thereof in load supporting positions.

4. A power operated loading device comprising a horizontally disposed load support, mobile means for supporting said support for horizontal movement of said support beneath a load of material to be handled, a pusher for said support, said pusher being mounted on said support for advancing and retracting movement thereon for discharging said load and for reconditioning said support for loading, expansible and contractible power operated means mounted on said mobile means for elevating said support into load discharging position, for lowering said support into reloading position, and for advancing and retracting said pusher, and a latching mechanism associated with a frame connected to said mobile means and with said pusher and operable at said load discharging position, said frame and pusher being provided with stops operable at said load discharging position for actuating said latching mechanism, said latching mechanism being operable at said load discharging position by one of said stops for connecting said power operating means first to said support and then to said pusher for elevating said support and then advancing said pusher during one continuous expansible movement of said power operated means, and by the other of said stops first to said pusher and then to said support for retracting said pusher and then lowering said support during a continuous contractible movement of said power operated means, said power operated means being connected to said support and to said pusher by rigid actuating members whereby each is directly responsive to and operable by the other.

5. A power operated loading device comprising a horizontally disposed load support, mobile means for supporting said support for horizontal movement of said support beneath a load of material to be handled, a pusher for said support, said pusher being mounted on said support for advancing and retracting movement thereon for discharging said load and for reconditioning said support for loading, expansible and contractible power operated means mounted on said mobile means for elevating said support into load discharging position, for lowering said support into reloading position, and for advancing and retracting said pusher, and a latching mechanism associated with a frame connected to said mobile means and with said pusher and operable at said load discharging position, said frame and pusher being provided with stops operable at said load discharging position for actuating said latching mechanism, said latching mechanism being operable at said load discharging position by one of said stops for connecting said power operating means first to said support and then to said pusher for elevating said support and then advancing said pusher during one continuous expansible movement of said power operated means, and by the other of said stops first to said pusher and then to said support for retracting said pusher and then lowering said support during a continuous contractible movement of said power operated means, said power operated means being connected to said support and to said pusher by rigid actuating members whereby each is directly responsive to and operable by the other, said support being mounted on parallel links attachable to said mobile means for elevating and lowering said support in load supporting positions.

CARROLL R. COOK.

REFERENCES CITED

The following references are of record in the file of this patent:

UNITED STATES PATENTS

| Number | Name | Date |
|---|---|---|
| 2,106,402 | Carlesimo | Jan. 25, 1938 |
| 2,311,523 | Cope et al. | Feb. 16, 1943 |
| 2,372,870 | Willrodt | Apr. 3, 1945 |
| 2,397,045 | Richey | Mar. 19, 1946 |
| 2,397,046 | Richey | Mar. 19, 1946 |
| 2,409,302 | Millikin | Oct. 15, 1946 |